United States Patent
Negishi et al.

(10) Patent No.: US 6,754,239 B2
(45) Date of Patent: *Jun. 22, 2004

(54) MULTIPLEXING APPARATUS AND METHOD, TRANSMITTING APPARATUS AND METHOD, AND RECORDING MEDIUM

(75) Inventors: Shinji Negishi, Kanagawa (JP); Katsumi Tahara, Kanagawa (JP); Noriaki Oishi, Kanagawa (JP)

(73) Assignee: Sony Corpration, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 206 days.

(21) Appl. No.: 09/048,193

(22) Filed: Mar. 25, 1998

(65) Prior Publication Data

US 2001/0040903 A1 Nov. 15, 2001

(30) Foreign Application Priority Data

Mar. 28, 1997 (JP) ............................................. P9-077286

(51) Int. Cl.[7] ............................ H04J 3/02; H04L 12/28; H04N 7/12; H04N 7/00

(52) U.S. Cl. .................. 370/537; 370/538; 370/395.64; 348/423; 348/845.1

(58) Field of Search ................................. 370/537, 474, 370/540, 487, 535, 538, 490, 539, 468, 465, 541, 542, 545, 412, 428, 429, 522, 524, 521, 395.43, 395.4, 395.2; 348/515, 423, 465, 906

(56) References Cited

U.S. PATENT DOCUMENTS

| | | | | |
|---|---|---|---|---|
| 5,381,412 A | * | 1/1995 | Otani | 370/538 |
| 5,671,226 A | * | 9/1997 | Murakami et al. | 370/474 |
| 5,793,425 A | * | 8/1998 | Balakrishnan | 370/537 |
| 5,835,498 A | * | 11/1998 | Kim et al. | 370/537 |
| 5,936,958 A | * | 8/1999 | Soumiya et al. | 370/395 |
| 6,040,867 A | * | 3/2000 | Bando et al. | 370/537 |
| 6,122,338 A | * | 9/2000 | Yamauchi | 370/521 |
| 6,151,334 A | * | 11/2000 | Kim et al. | 370/468 |
| 6,157,674 A | * | 12/2000 | Oda et al. | 375/240 |
| 6,212,201 B1 | * | 4/2001 | Hinderks et al. | 370/468 |
| 6,404,776 B1 | * | 6/2002 | Voois et al. | 370/468 |

* cited by examiner

*Primary Examiner*—Hassan Kizou
*Assistant Examiner*—Hanh Nguyen
(74) *Attorney, Agent, or Firm*—Sonnenschein, Nath & Rosenthal LLP

(57) ABSTRACT

A multiplexing apparatus and method, a transmitting apparatus and method, and a recording medium arranged to prevent a delay of one of multiplexing scheduling processing and multiplexing processing in accordance with a schedule obtained by the multiplexing scheduling processing from influencing the other of these processings. A scheduler calculates schedule information on the basis of access unit information from an encoder and stores the calculated schedule information by supplying it to an intermediate buffer. If some additional data is to be multiplexed, the scheduler also calculates the additional data and stores the calculated additional data by supplying it to an intermediate buffer. A bit stream multiplexer reads out schedule information from the schedule information intermediate buffer, selects data designated by the schedule information from an elementary stream from the encoder and from additional data stored in the additional data intermediate buffer, and outputs the data as a multiplexed stream.

14 Claims, 13 Drawing Sheets

TRANSPORT STREAM HEADER: 4 BYTE THROUGH sync_byte continuity_counter (SEE ISO/IEC 13818-1)
CLOCK REFERENCE: TIME OF INPUT TO DECODER (ENCODED IN MULTIPLEXED STREAM BY MULTIPLEXER)
ADDITIONAL INFORMATION PACKET: PACKET FORMED OF DATA SUCH AS STREAM INFORMATION OTHER THAN ELEMENTARY STREAM

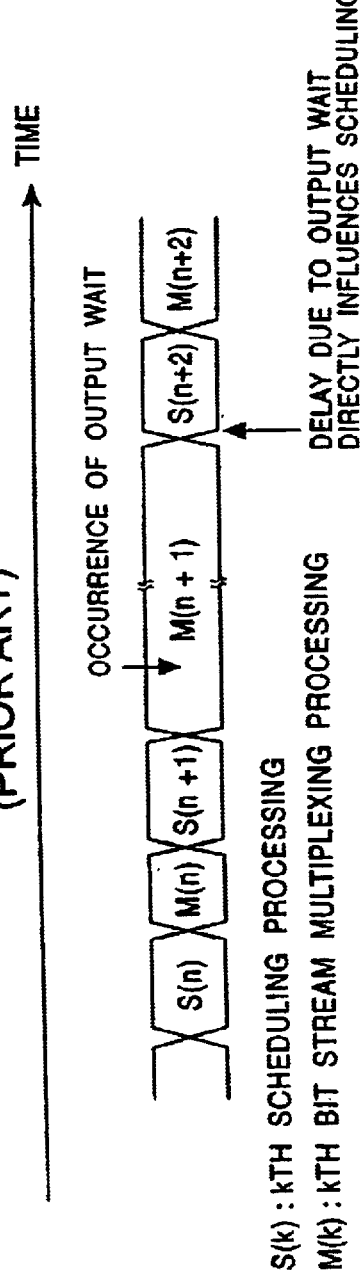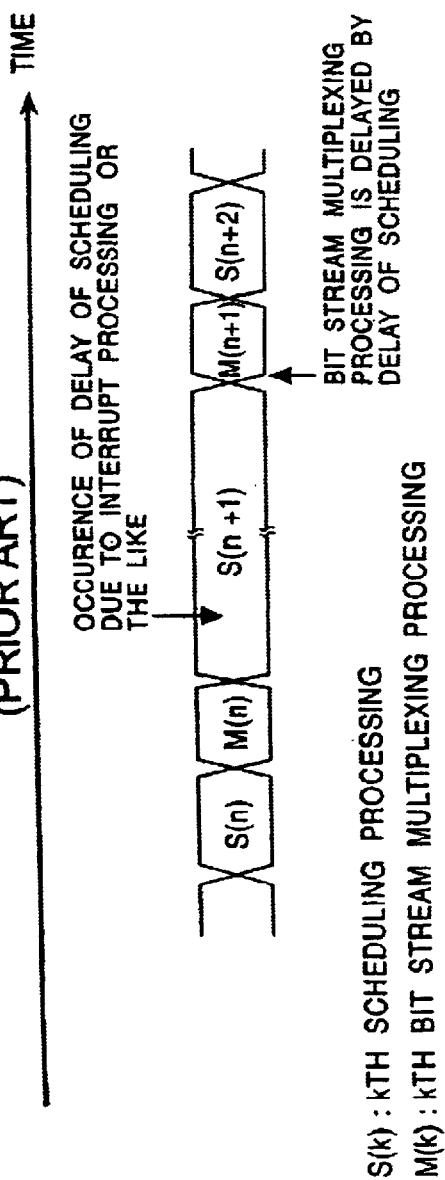

MULTIPLEXING APPARATUS AND METHOD, TRANSMITTING APPARATUS AND METHOD, AND RECORDING MEDIUM

BACKGROUND OF THE INVENTION

1. Field of the Invention

The present invention relates to a multiplexing apparatus and method, a transmitting apparatus and method, and a recording medium. More particularly, the present invention relates to a multiplexing apparatus and method, a transmitting apparatus and method, and a recording medium suitable for use, for example, in a situation where a bit stream of a digital signal formed from an image (moving image) signal and an audio signal is recorded on a recording medium such as a magneto-optical disk or a magnetic tape and is reproduced to be displayed on a display, or in a situation where such a bit stream is transmitted from a transmitting terminal to a receiving terminal over a transmission channel in a television conference system, a video telephone system, broadcasting apparatuses or the like, and is received at the receiving terminal to be displayed.

2. Description of the Related Art

FIG. 7 shows the configuration of an example of a conventional multiplexing/demultiplexing apparatus.

At a transmitting terminal, a digital image signal (video data) is supplied to a video encoder 101, which compresses and encodes a bit stream of video data in accordance with a standard, e.g., ISO13818-2 (so-called MPEG (Moving Picture Experts Group) 2 video standard), ISO11172-2 (so-called MPEG1 video standard) or the like, and thereafter outputs the compressed and encoded data. A digital audio signal (audio data) is supplied to an audio encoder 102, which compresses and encodes a bit stream of audio data in accordance with a standard, e.g., ISO13818-3 (so-called MPEG2 audio standard), ISO11172-3 (so-called MPEG1 audio standard) or the like, and thereafter outputs the compressed and encoded data. Another encoder 103 is supplied with digital data (other data) other than video data and audio data. The encoder 103 encodes and outputs the other data.

A bit stream compressed and encoded and thereafter output will be referred to as "elementary stream" as occasion demands.

Elementary streams of video data, audio data and other data respectively output from the video encoder 101, the audio encoder 102 and the other encoder 103 are supplied to a multiplexer 104. The multiplexer 104 multiplexes the elementary streams of video data, audio data, other data, and additional data (additional information) necessary in a time division multiplexing manner at a receiving terminal. A stream obtained by this multiplexing (hereinafter referred to as "multiplexed stream" as occasion demands) is recorded on a predetermined recording medium 105 or is transmitted through a predetermined transmission medium 106.

At the receiving terminal, the multiplexed stream reproduced from the recording medium 105 or received through the transmission medium 106 is supplied to a demultiplexer 107. The demultiplexer 107 separates the multiplexed stream into elementary streams of video data, audio data and other data, and additional data by referring to the additional data in the multiplexed stream. The elementary streams of video data, audio data and other data are respectively supplied to a video decoder 108, an audio decoder 109 and another decoder 110 to be respectively decoded into video data, audio data and other data in certain formats.

The decoded video data is supplied to, for example, a display unit such as a cathode ray tube (CRT) or a liquid crystal display to be displayed. The decoded audio data is supplied to, for example, a speaker or the like to be output. The other data is supplied to, for example, a predetermined recording medium to be recorded.

With respect to the above-described multiplexing of elementary streams at a transmitting terminal, a standard model (system target decoder (STD)) corresponding to a decoder at a receiving terminal is supposed and time division multiplexing is performed so that decoding (decode processing) can be correctly performed in the STD.

FIG. 8 shows the configuration of an example of an STD in accordance with ISO13818-1 (so-called MPEG2 system) and ISO11172-1 (so-called MPEG1 system).

A multiplexed stream formed by time-division-multiplexing elementary streams is input to the STD. The multiplexed stream contains time information (clock reference) as additional data, and is input to the STD at a time corresponding to the time information. The multiplexed stream also contains multiplexing rate information MUX_rate as additional data, and is input to the STD at a data rate corresponding to this multiplexing rate information.

The multiplexed stream input to the STD is supplied to a switch 111. The switch 111 selects one of input terminals of a video buffer 112, audio buffers $113_1$ to $113_N$ and another buffer 114 to enable video data, audio data (N-channel audio data) or other data to be supplied to and stored in the corresponding buffer (video buffer 112, audio buffers $113_1$ to $113_N$) or buffer 114).

Each of the elementary streams of video data, audio data (N-channel audio data) and other data respectively stored in the video buffer 112, the audio buffers $113_1$ to $113_N$ and the other buffer 114 is instantly read out by a length corresponding to its predetermined decoded unit.

Such a decoded unit is called an access unit. With respect to video data, one frame, for example, is prescribed as an access unit. With respect to audio data, one audio frame, for example, is prescribed as an access unit. The length of one audio frame of audio data varies depending upon the sampling frequency at which the audio data was sampled.

The multiplexed stream also contains the decoding time of each access unit as additional data. Each of access units of video data, audio data and other data stored in the video buffer 112, the audio buffers $113_1$ to $113_N$ and the other buffer 114 is instantly read out at the corresponding decoding time to be supplied to a decoder 115, decoders $116_1$ to $116_N$, or a decoder 117. Video data decoded by the decoder 115 is output to a CRT display unit or the like via a reorder buffer 118 and a switch 119.

Each access unit is read out according to the decoding time to ensure synchronization between the elementary streams. That is, for example, synchronization between images and corresponding sounds is ensured.

Each of access units into which the data is separated by the switch 111 is stored till a predetermined time (the above-mentioned decoding time) in the video buffer 112, the audio buffers $113_1$ to $113_N$ or the other buffer 114 of the STD. These buffers will be referred to collectively as "STD buffer". Accordingly, on the transmitting side, it is necessary to perform scheduling of time division multiplexing in order to prevent an overflow in the STD buffer (an excess of data accumulated in the STD buffer over the capacity of the STD buffer) or an underflow (failure to store one complete access unit in the STD buffer before the decoding time).

FIGS. 9A and 9B show the formats of multiplexed streams prescribed in ISO13818-1, for example.

A multiplexed stream is obtained by time-division-multiplexing at least one elementary stream and is formed of a plurality of packets. That is, each of elementary streams is separated into packets, and the time of being input to the decoder (clock reference), the decoding time at which each access unit is decoded (displayed), etc., are added to the packets, thus forming a multiplexed stream.

In ISO13818-1, as shown in FIGS. 9A and 9B, a transport stream (FIG. 9A) and a program stream (FIG. 9B) are prescribed. A transport stream is a stream for use in transmission in an environment having such an influence as to cause errors such as a bit error and cell loss. For example, such a stream is used in transmission channels of asynchronous transfer mode (ATM) networks and digital broadcasting. A program stream is a stream for use in transmission in an environment with a reduced possibility of occurrence of errors. In particular, such a stream is used with a recording medium in the form of a disk or a tape.

As shown in FIG. 9A, a transport stream is formed of transport stream packets of a fixed length in which elementary streams (of video data, audio data, and other data), etc., are set, and other packets in which are set an adaptation field containing a clock reference, etc., and additional information (additional information in a narrow sense) including, if the transport stream is a multi-program transport stream, program specific information (PSI) on selection from a plurality of programs, extraction of the desired packet and the method of decoding.

Each packet has a transport stream header, and the packets in which elementary streams are set may have packet headers, each packet header containing a decoding time, information on the contents of the packet, etc.

On the other hand, as shown in FIG. 9B, a program stream is formed of a pack in which a certain number of packets of a variable length are combined. A packet header is attached to each packet. With respect to packets in which elementary streams are set, a decoding time is set in the corresponding packet header.

Also, a packet header is attached to each pack. In the program stream, a clock reference is set in the pack header.

The program stream further contains a packet in which additional data (additional information in a narrow sense) such as a program stream directory (PSD) or a program stream map (PSM) is set.

The aforementioned additional data (additional information in a broad sense) represents data other than elementary streams in the multiplexed stream.

Time division multiplexing for obtaining the above-described multiplexed stream is performed based on two processings described below.

That is, it is necessary to perform, as the first processing, scheduling which comprises forming suitable additional data and determining data to be multiplexed and the sizes of the multiplexed data in order to prevent an overflow and an underflow in an STD buffer of an STD supposed to exist at a receiving terminal and in order to ensure synchronization between elementary streams. (This kind of processing will be referred to as "multiplexing scheduling processing" as occasion demands.)

Then, it is necessary to perform, as the second processing, multiplexing of the elementary streams and the additional data on the basis of information on the data and the sizes determined by the multiplexing scheduling (hereinafter referred to as "schedule information" as occasion demands). (This kind of processing will be referred to as "bit stream multiplexing processing" as occasion demands.)

FIG. 10 shows the configuration of an example of a multiplexing apparatus which performs the above-described multiplexing scheduling processing and bit stream multiplexing processing in a time division manner.

In this multiplexing apparatus, a scheduler which performs multiplexing scheduling processing and a bit stream multiplexer which performs bit stream multiplexing processing are not definitely separated from each other, and these two processings are performed by a scheduler and bit stream multiplexer 122.

That is, encoders $121_1$ to $121_N$ encode video data and audio data into elementary streams, which are supplied to the scheduler and bit stream multiplexer 122. The scheduler and bit stream multiplexer 122 alternately performs multiplexing scheduling processing and bit stream multiplexing processing by using the elementary streams input thereto and by setting a schedule unit corresponding to, for example, a packet unit.

The problem of alternately performing multiplexing scheduling processing and bit stream multiplexing processing as described above, i.e., in a time division manner is that, if one of the two processings is delayed for some reason, the other processing is also delayed.

For example, a situation such as that shown in FIG. 11A may be considered where, when multiplexing scheduling processing S and bit stream multiplexing processing M are being performed alternately, a wait of outputting of the multiplexed stream occurs at a certain time and bit stream multiplexing processing M(n+1) of the (n+1)th packet is thereby delayed. In such a situation, multiplexing scheduling processing S(n+2) of the next (n+2)th packet cannot be performed before bit stream multiplexing processing M(n+1) is finished. Thus, a delay of bit stream multiplexing processing directly influences the next multiplexing scheduling processing.

Another situation shown in FIG. 11B, for example, may be considered where multiplexing scheduling processing S(n+1 of the (n+1)th packet is interrupted to be delayed. Also in such a situation, multiplexing scheduling processing M(n+1) of the (n+1)th packet cannot be performed.

As described above, a delay of one of the two processings directly influences the other processing, so that processing delay times are successively accumulated. When the length of the accumulated delay time is increased to a certain value, it becomes difficult to perform time division multiplexing in a real time required for, for example, broadcasting.

As a method for avoiding this problem, there is a method of reducing the multiplexing rate. However, if such a method is used, a high bit rate cannot be achieved. There is also a method of using an apparatus capable of performing multiplexing scheduling processing and bit stream multiplexing processing at a high speed. The entire apparatus for the processing of this method, however, is disadvantageously expensive. Further, there is a method of providing a buffer having a large capacity in a stage following the scheduler and bit stream multiplexer 122, sufficiently accumulating the multiplexed stream in the buffer and thereafter outputting the multiplexed stream. The entire apparatus for the processing of this method, however, is disadvantageously expensive and large in size.

In a case where images formed by a video camera, for example, are multiplexed by the above-described multiplexing apparatus and recorded by a recording apparatus, if a waiting time of the recording apparatus occurs, it propagates as a processing delay from bit stream multiplexing processing to multiplexing scheduling processing. In such a situation, processing of the images successively output from the video camera cannot be performed suitably. To prevent such waiting time propagation, a large-capacity buffer is also required, result in increases in the cost and size of the entire apparatus.

FIG. 12 shows the configuration of an example of a multiplexing apparatus which performs multiplexing scheduling processing and bit stream multiplexing processing separately from each other.

The sizes and decoding (display) times of access units constituting elementary streams output from encoders $121_1$ to $121_N$ are supplied as access unit information to a scheduler 131, in which data to be next multiplexed and the size of the data, i.e., schedule information, are calculated on the basis of access information.

While, in the arrangement shown in FIG. 12, access unit information is obtained from the encoders $121_1$ to $121_N$ outputting elementary streams, processing for extracting access unit information from elementary streams may be performed as a preprocessing before multiplexing scheduling processing if the encoders $121_1$ to $121_N$ cannot output access unit information.

It is not necessary to limit the information output as access unit information by the encoders $121_1$ to $121_N$ to the sizes and decoding times of access units. Information from which the sizes and decoding times of access units can be obtained may suffice. For example, with respect to image data encoded in accordance with the ISO13818-2 standard, relative values of decoding times can be obtained if the frame rates of elementary streams of the image data and repeat__first__field/picture__coding__type of access units are known.

The scheduler 131 sets, for example, a packet unit or the like as one schedule unit, calculates schedule information and additional data on the basis of access information, and commands (outputs a multiplexing command to) a bit stream multiplexer 132 to perform multiplexing by outputting these information and data to the bit stream multiplexer 132.

The bit stream multiplexer 132 is supplied with elementary streams from the encoders $121_1$ to $121_N$, and time-division-multiplexes the elementary streams and additional data from the scheduler 131 by a multiplexing command from the scheduler 131 and in accordance with schedule information from the scheduler 131.

After finishing the bit stream multiplexing processing, the bit stream multiplexer 132 outputs a multiplexing end notice to the scheduler 131 to inform the same of the end of the processing, and waits for the next multiplexing command from the scheduler 131. On the other hand, when the scheduler 131 receives a multiplexing end notice, it outputs a multiplexing command together with the next schedule information and additional data if the calculation of the next schedule information and additional data has been completed.

Successively, the scheduler 131 and the bit stream multiplexer 132 repeat the same processings.

As described above, the scheduler 131 and the bit stream multiplexer 132 respectively perform multiplexing scheduling processing and bit stream multiplexing processing separately from each other. In such a case, while the bit stream multiplexer 132 is performing bit stream multiplexing processing, the scheduler 131 can start the next multiplexing scheduling processing. Thus, the influence of a delay of bit stream multiplexing processing upon the scheduler 131 is reduced in comparison with the case shown in FIG. 10. It is also possible to speed up the processing as a whole.

However, the scheduler 131 cannot transmit the next schedule information and additional data to the bit stream multiplexer 132 unless it receives a multiplexing end notice from the bit stream multiplexer 132. Therefore, if, for example, as shown in FIG. 13A, a long wait of outputting of the multiplexed bit stream by the bit stream multiplexer 132 occurs, the delay of the outputting propagates to multiplexing scheduling processing of the scheduler 131. That is, in such a case, the scheduler 131 cannot start the next multiplexing scheduling processing before it receives a multiplexing end notice. FIG. 13A shows a state in which bit stream multiplexing processing M(n+1) of the (n+1)th packet is delayed and multiplexing scheduling processing S(n+3) of the (n+3)th packet cannot be started.

If, for example, as shown in FIG. 13B, multiplexing scheduling processing is delayed for a long time by an interrupt in multiplexing scheduling processing, bit stream multiplexing processing cannot be started, also resulting in a delay of the processing. FIG. 13B shows a state in which multiplexing scheduling processing S(n+1) of the (n+1)th packet is delayed and bit stream multiplexing processing M(n+1) of the (n+1)th packet cannot be started.

That is, in the multiplexing apparatus shown in FIG. 12, since multiplexing scheduling processing is performed with a one-cycle precedence, a delay corresponding to one processing cycle can be absorbed. However, there is no means for coping with a longer delay, and there is the same problem as that relating to FIG. 10.

SUMMARY OF THE INVENTION

In view of the above-described circumstances, an object of the present invention is to provide a multiplexing apparatus and method, a transmitting apparatus and method, and a recording medium arranged to minimize the propagation of a delay of one of multiplexing scheduling processing and bit stream multiplexing processing to the other of these processings.

To achieve the above-described object, according to one aspect of the present invention, there is provided a multiplexing apparatus which time-division-multiplexes at least one digital signal bit stream and additional information added to the bit stream, the apparatus comprising schedule information calculation means for calculating schedule information on a schedule of time division multiplexing on the basis of access unit information on an access unit prescribed in the bit stream, schedule information storage means for storing the schedule information output by the schedule information calculation means, additional information calculation means for calculating the additional information, additional information storage means for storing the additional information output by the additional information calculation means, and multiplexing means for time-division-multiplexing the bit stream and the additional information on the basis of the schedule information stored by the schedule information storage means.

According to another aspect of the present invention, there is provided a multiplexing method of time-division-multiplexing at least one digital signal bit stream and additional information added to the bit stream, the method comprising the steps of calculating schedule information on a schedule of time division multiplexing on the basis of access unit information on an access unit prescribed in the bit stream, and calculating the additional information, storing the schedule information and the additional information, and time-division-multiplexing the bit stream and the additional information on the basis of the schedule information.

According to still another aspect of the present invention, there are provided a transmitting apparatus, a transmitting method and a recording medium arranged to transmit or record a multiplexed stream formed by time-division-multiplexing at least one digital signal bit stream and additional information be added to the bit stream. The multiplexed stream transmitted by the transmitted by these apparatus and method or recorded on the recording medium is obtained by calculating schedule information on a schedule of time division multiplexing on the basis of access unit information on an access unit prescribed in the bit stream, by calculating the additional information, by storing the schedule information and the additional information, and by time-division-multiplexing the bit stream and the additional information on the basis of the schedule information.

In the above-described multiplexing apparatus, the schedule information calculation means calculates schedule information on a schedule of time division multiplexing on the basis of access unit information on an access unit prescribed in a bit stream, and the schedule information storage means stores the schedule information. The additional information calculation means calculates additional information, and the additional information storage means stores the additional information. The multiplexing means time-division-multiplexes the bit stream and the additional information on the basis of the schedule information stored by the schedule information storage means.

In the above-described multiplexing method, schedule information on a schedule of time division multiplexing is calculated on the basis of access unit information on an access unit prescribed in a bit stream, additional information is calculated, the schedule information and the additional information are stored, and the bit stream and the additional information are time-division-multiplexed on the basis of the schedule information.

In the above-described transmitting apparatus, transmitting method, the recording medium, a multiplexed stream is obtained by calculating schedule information on a schedule of time division multiplexing on the basis of access unit information on an access unit prescribed in a bit stream, by calculating additional information, by storing the schedule information and the additional information, and by time-division-multiplexing the bit stream and the additional information on the basis of the schedule information.

BRIEF DESCRIPTION OF THE DRAWINGS

FIG. 9B showing the structure of a program stream;

FIGS. 11A and 11B are timing charts of processing in the multiplexing apparatus shown in FIG. 10, FIG. 11A showing an example of influence of an output wait causing a delay of scheduling, FIG. 11B showing an example of influence of a delay of scheduling causing a delay of bit stream multiplexing output;

DESCRIPTION OF THE PREFERRED EMBODIMENTS

Figure 1:
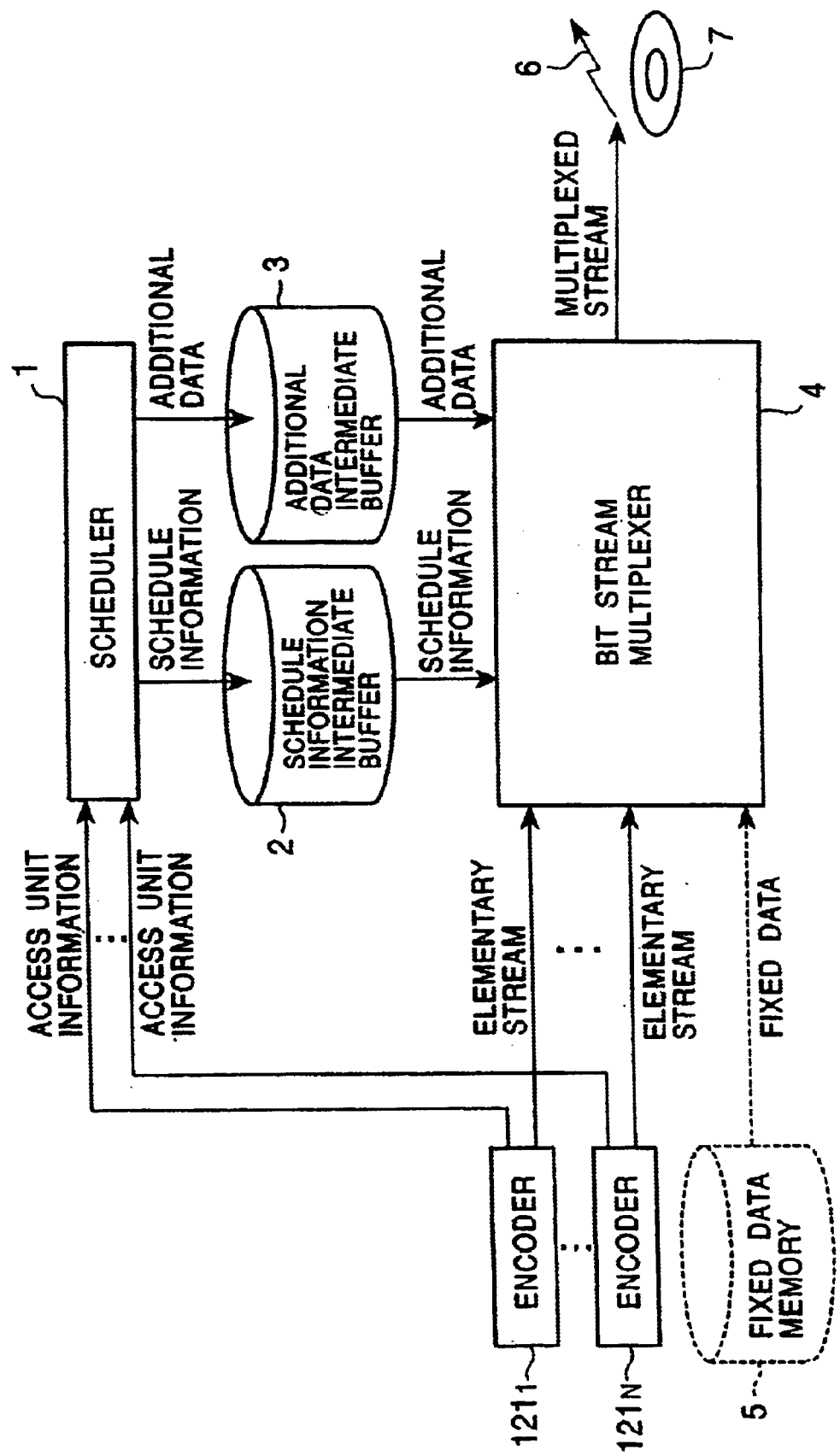
FIG. 1 is a block diagram showing the configuration of a first embodiment of a multiplexing apparatus to which the present invention has been applied.

FIG. 1 shows the configuration of an embodiment of a multiplexing apparatus to which the present invention has been applied.

Video data, audio data and other data are input to encoders $121_1$ to $121_N$, each of which compresses and encodes the data in accordance with a predetermined standard, e.g., ISO13818-2, ISO11172-2, ISO13813-3, or ISO11172-3, and thereafter outputs the compressed and encoded data as an elementary stream. Also, the encoders $121_1$ to $121_N$ are arranged to obtain and output access unit information on access units constituting elementary streams which they output.

Access unit information and elementary streams which are output by the encoders $121_1$ to $121_N$ are respectively supplied to a scheduler 1 (schedule information calculation means) (additional information calculation means) and a bit stream multiplexer 4 (multiplexing means).

As mentioned above, if the encoders $121_1$ to $121_N$ are incapable of calculating access unit information, the arrangement may be such that preprocessing for extracting access unit information from elementary streams is performed and access unit information obtained by the preprocessing is input to the scheduler 1. Also, it is not necessary to limit the information output as access unit information by the encoders $121_1$ to $121_N$ to the sizes and decoding times of access units. Information from which the sizes and decoding times of access units can be obtained may suffice.

The scheduler 1 is arranged to perform multiplexing scheduling processing for calculating schedule information and necessary additional data (additional information in a broad sense) on the basis of access unit information from the encoders $121_1$ to $121_N$. Schedule information and additional data obtained by the scheduler 1 are respectively supplied to a schedule information intermediate buffer 2 (schedule information storage means) and an additional data intermediate buffer 3 (additional information storage means).

The schedule information intermediate buffer 2 is arranged to store schedule information supplied from the scheduler 1. The additional data intermediate buffer 3 is arranged to store additional data supplied from the scheduler 1.

The schedule information intermediate buffer 2 or the additional data intermediate buffer 3 has a storage capacity such as to be able to store schedule information or additional data output from the scheduler 1 a certain number of times. In this embodiment, each of the schedule information intermediate buffer 2 and the additional data intermediate buffer 3 is designed so as to operate as a so-called ring buffer such that input data is successively stored and, after the space area has been reduced to zero, new data is overwritten in the area where the oldest data is stored.

The bit stream multiplexer 4 is arranged to read out schedule information from the schedule information intermediate buffer 2, and necessary additional data from the additional data intermediate buffer 3, to multiplex elementary streams from the encoders $121_1$ to $121_N$ and the necessary additional data in accordance with the schedule information, and outputs the result of the multiplexing as a multiplexed stream.

In the thus-arranged multiplexing apparatus, the encoders $121_1$ to $121_N$ encode input video data, audio data and other data input to them and output the encoded data in the form of elementary streams. The encoders $121_1$ to $121_N$ also obtain and output access unit information on access units constituting the elementary streams that they output.

The access unit information and the elementary streams output by the encoders $121_1$ to $121_N$ are respectively supplied to the scheduler 1 and the bit stream multiplexer 4.

When the scheduler 1 receives the access unit information from the encoders $121_1$ to $121_N$, it calculates schedule information on the basis of the access unit information, and supplies the schedule information to the schedule information intermediate buffer 2 to store it. If some additional data is to be multiplexed when bit stream multiplexing processing is performed in accordance with the calculated schedule information, the scheduler 1 also calculates (forms) the corresponding additional data and supplies the calculated additional data to the additional data intermediate buffer 3 to store it.

The scheduler 1 performs multiplexing scheduling as described above each time it receives access unit information.

On the other hand, the bit stream multiplexer 4 reads out schedule information from the schedule information intermediate buffer 2, selects the data designed by the schedule information by the size also selected by the schedule information, and outputs the selected data as a multiplexed stream. That is, the bit stream multiplexer 4 selects the data corresponding to the schedule information by the size corresponding to the schedule information from the elementary streams from the encoders $121_1$ to $121_N$ and the additional data stored in the additional data intermediate buffer 3, and outputs the selected data as a multiplexed stream.

This multiplexed stream is transmitted through a transmission medium 6 formed of, for example, the Internet, a CATV network, a satellite channel, a ground channel or the like, or is recorded on a recording medium 7 formed of a magneto-optical disk, a magnetic tape, a phase change rewritable disk, an optical disk or the like.

Thereafter, the bit stream multiplexer 4 reads out the next stored schedule information from the schedule information intermediate buffer 2 and successively repeats the bit stream multiplexing processing.

Figure 2:
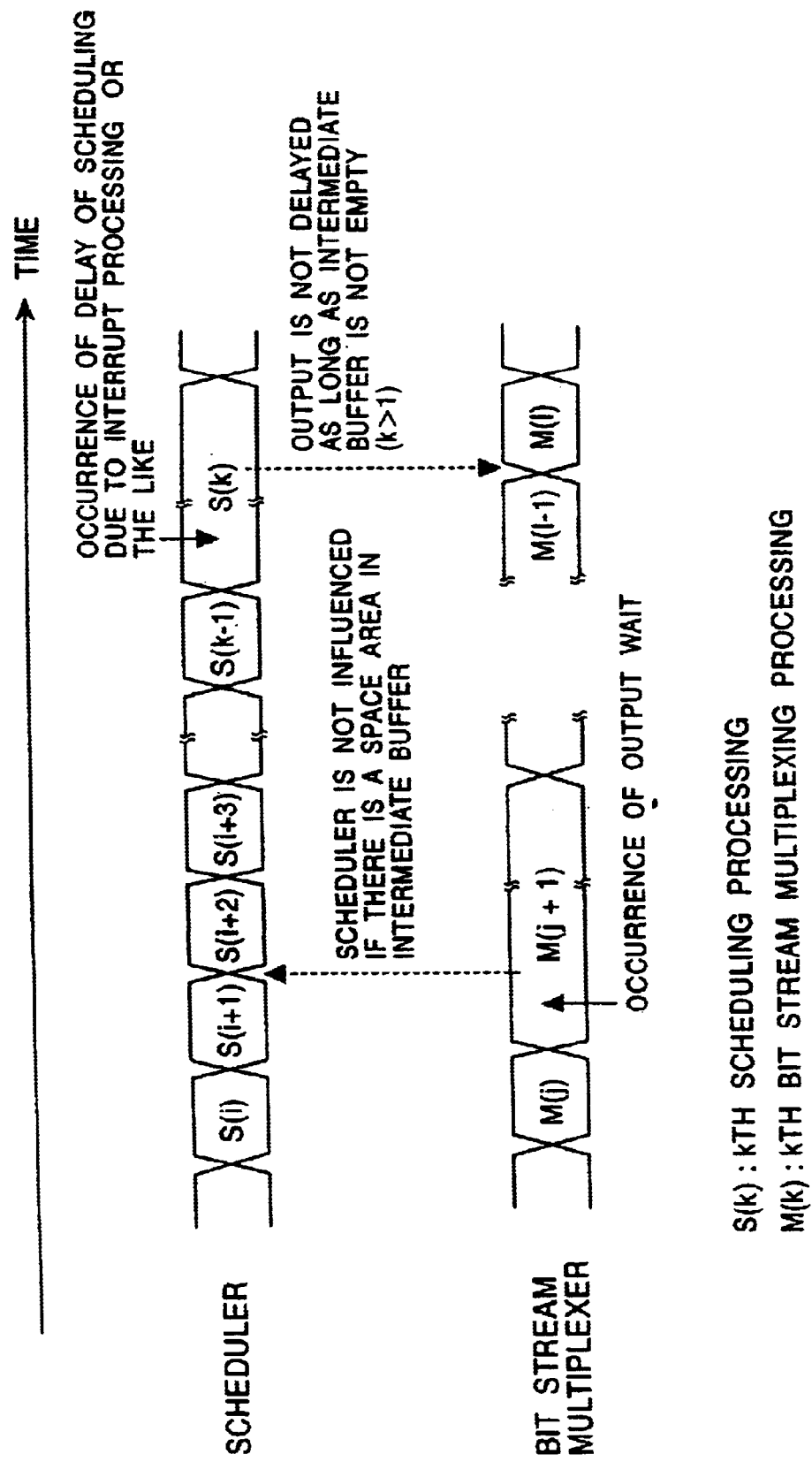
FIG. 2 is a timing chart showing timing of processings performed by scheduler 1 and bit stream multiplexer 4 shown in FIG. 1.

Consequently, the scheduler 1 can perform multiplexing scheduling processing independently of the progress of bit stream multiplexing processing in the bit stream multiplexer 4 as long as each of the schedule information intermediate buffer 2 and the additional data intermediate buffer 3 (the combination of which hereinafter referred to as an intermediate buffer as occasion demands) is not in a buffer-full state (a state of having no space area and having the oldest data not yet used by the bit stream multiplexer 4), as shown in FIG. 2. That is, even if bit stream multiplexing processing is delayed by occurrence of a wait of outputting of the multiplexed stream by the bit stream multiplexer 4, the scheduler 1 can advance multiplexing scheduling processing without being influenced by the delay as long as the intermediate buffer is not full.

Figure 12:
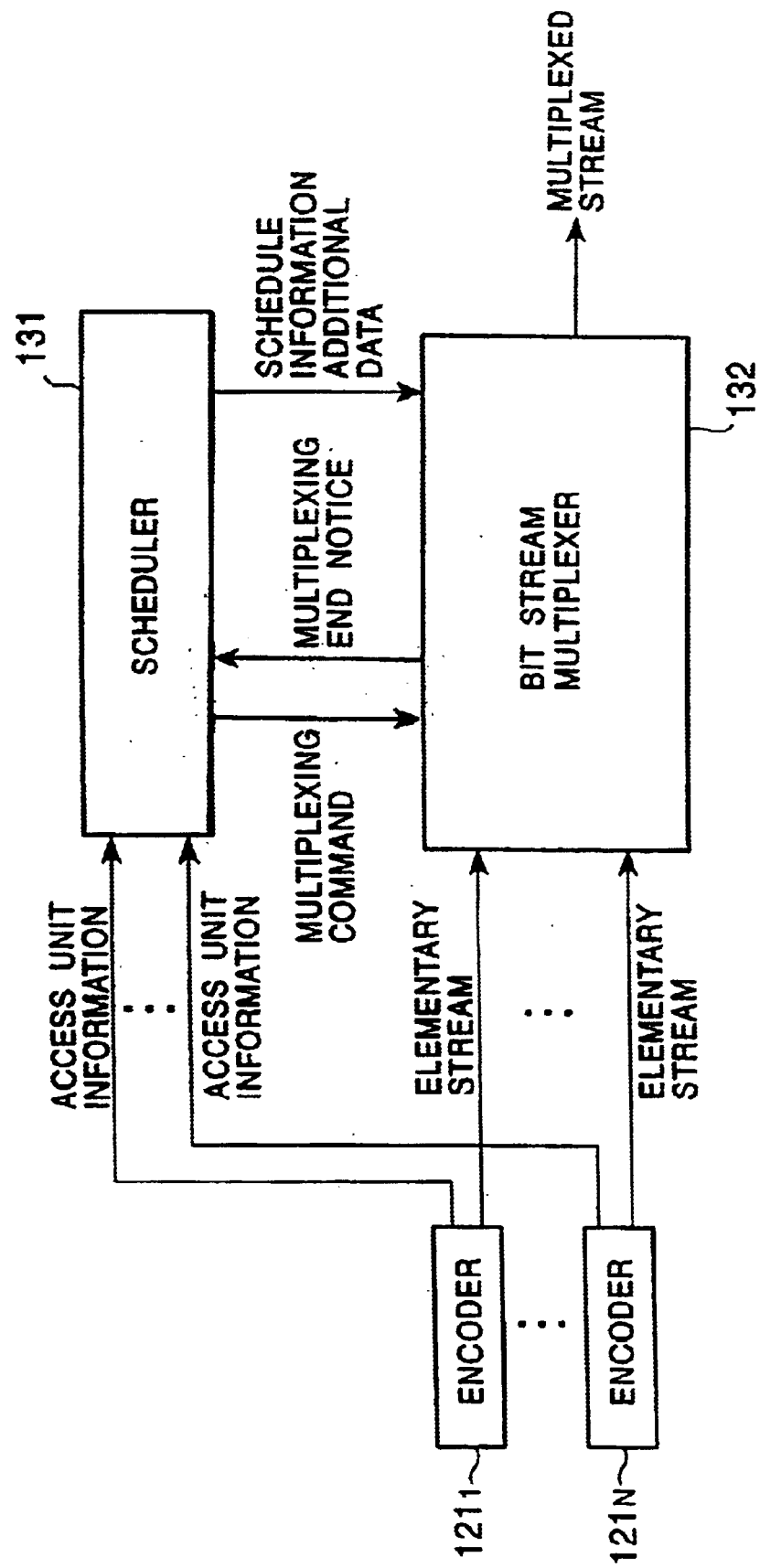
FIG. 12 is a block diagram showing the configuration of another example of the conventional multiplexing apparatus.
Figure 13A:
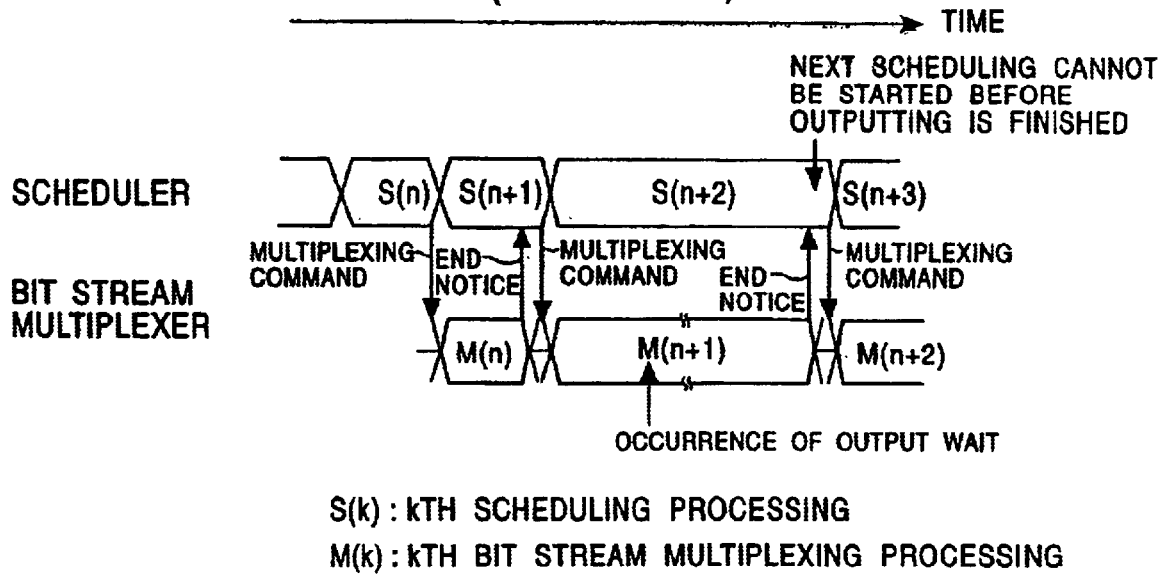
FIGS. 13A and 13B are timing charts of processings in the multiplexing apparatus shown in FIG. 12, FIG. 13A showing an example of influence of an output wait causing a delay of scheduling, FIG. 13B showing an example of influence of a delay of scheduling causing a delay of bit stream multiplexing output.
Figure 13B:
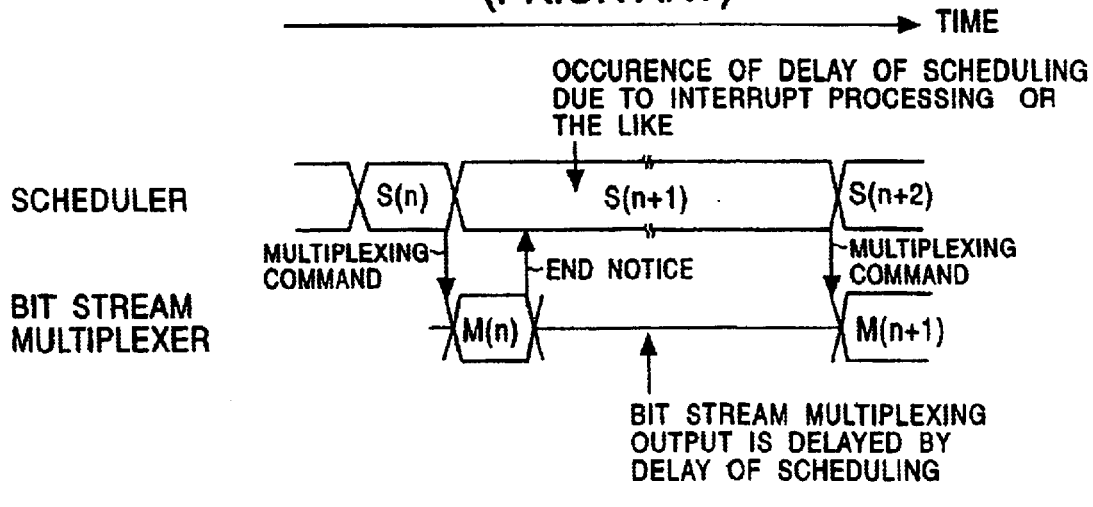

The scheduler 1 is free from a need to perform control for starting the next multiplexing scheduling processing after receiving a multiplexing end notice as described above with reference to FIG. 12, and is also free from a need to perform control for outputting a multiplexing command each time multiplexing scheduling processing is finished as described above with reference to FIG. 12. As a result, the processing in the scheduler 1 can be simplified.

On the other hand, the bit stream multiplexer 4 can perform bit stream multiplexing processing independently of the progress of multiplexing scheduling processing in the scheduler 1 as long as the intermediate buffer is not empty (the intermediate buffer is a sate of having some stored data not yet used in bit stream multiplexing processing), as shown in FIG. 2. That is, even if multiplexing scheduling processing is delayed by occurrence of an interrupt in the scheduler 1, the bit stream multiplexer 4 can advance bit stream multiplexing processing without being influenced by the delay as long as the intermediate buffer is not empty.

The bit stream multiplexer 4 is free from a need to perform control for starting bit stream multiplexing processing after receiving a multiplexing command as described above with reference to FIG. 12, and is also free from a need to perform control for outputting a multiplexing end notice each time bit stream multiplexing processing is finished as described above with reference to FIG. 12. As a result, the processing in the bit stream multiplexer 4 can be simplified.

It is not always necessary for the scheduler 1 to form fixed data in additional data, e.g., stuffing bits or a start code in the additional data. For example, such data may be stored in a fixed data memory 5 provided as indicated by the broken line in FIG. 1. In such a case, fixed data in additional data may be read out from the fixed data memory 5 to be supplied to the bit stream multiplexer 4, and there is no need to form the fixed data in the scheduler 1. The processing load on the scheduler 1 can be reduced in this manner.

The processing performed by the scheduler 1 shown in FIG. 1 will be described in more detail with reference to the flowchart of FIG. 3.

In step S1, in the scheduler 1, a determination is first made as to whether access unit information necessary for multiplexing scheduling processing ready to start has already been received from the encoders $121_1$ to $121_N$. If it is determined that necessary information has not been received, step S1 is repeated. If it is determined in step S1 that necessary access unit information has been received, the process advances to step S2 to calculate schedule information with respect to a schedule unit corresponding to, for example, a packet unit, which is a current object of multiplexing scheduling processing, on the basis of the access unit information.

That is, if multiplexing of data into a multiplexed stream in accordance with, for example, ISO13818-1 and ISO11172-1 is performed, schedule information is calculated so as to avoid an underflow and an overflow in the STD buffer supposed to exist at a receiving terminal and to be adapted to elementary streams.

After calculating schedule information, the process advances to step S3 to make a determination as to whether the schedule information can be output to the schedule information intermediate buffer 2. If it is determined in step S3 that the schedule information cannot be output to the schedule information intermediate buffer 2, that is, the schedule information intermediate buffer 2 is full, step S3 is repeated.

On the other hand, if it is determined in step S3 that the schedule information can be output to the schedule information intermediate buffer 2, that is, the schedule information intermediate buffer 2 is not full, the process advances to step S4 to output the schedule information obtained in step S2 to the schedule information intermediate buffer 2. The schedule information is thereby stored in the schedule information intermediate buffer 2.

If the schedule information intermediate buffer 2 is full, it is necessary for the scheduler 1 to stop multiplexing scheduling processing until the buffer full state is canceled. In this case, however, the suspension of multiplexing scheduling processing does not influence bit stream multiplexing processing performed by the bit stream multiplexer 4 since unused schedule information is stored in the schedule information intermediate buffer 2. In this situation, since decision by the scheduler 1 as to whether multiplexing scheduling processing should be stopped depends upon whether the schedule information intermediate buffer 2 is full or not, it is not necessary for the scheduler 1 to receive a multiplexing end notice from the bit stream multiplexer 4 as in the conventional art.

After outputting the schedule information, the process advances to step S5 to make a determination as to whether there is a need for additional data when bit stream multiplexing is performed in accordance with the schedule information. If it determined in step S5 that no additional data is required, the process returns to step S1 to perform the next multiplexing scheduling processing.

If it determined in step S5 that additional data is required, the process advances to step S6 to form necessary data.

That is, if multiplexing of data into a multiplexed stream in accordance with, for example, ISO13818-1 and ISO11172-1 is performed, then additional data, e.g., a pack header, a packet header, or data other than elementary streams is formed when it is to be output as a multiplexed stream.

As described above, fixed data in additional data can be stored in the fixed data memory 5 and can be read out of the memory when required. However, data which changes with time, e.g., a clock reference needs to be formed by the scheduler 1 when required.

After forming additional data, the process advances to step S7 to make a determination as to whether the additional data can be output to the additional data intermediate buffer 3. If it is determined in step S7 that the additional data cannot be output to the additional data intermediate buffer 3, that is, the additional data intermediate buffer 3 is full, step S7 is repeated.

On the other hand, if it is determined in step S7 that the additional data can be output to the additional data intermediate buffer 3, that is, the additional data intermediate buffer 3 is not full, the process advances to step S8 to output the additional data obtained in step S6 to the additional data intermediate buffer 3. The additional data is thereby stored in the additional data intermediate buffer 3.

If the additional data intermediate buffer 3 is full, it is necessary for the scheduler 1 to stop multiplexing scheduling processing until the buffer full state is canceled. However, the suspension of multiplexing scheduling processing does not influence bit stream multiplexing processing performed by the bit stream multiplexer 4 since unused additional data is stored in the additional data intermediate buffer 3. In this situation, since decision by the scheduler 1 as to whether multiplexing scheduling processing should be stopped depends upon whether the additional data intermediate buffer 3 is full or not, it is not necessary for the scheduler 1 to receive a multiplexing end notice from the bit stream multiplexer 4 as in the conventional process.

After outputting the additional data to the additional data intermediate buffer 3, the process returns to step S1 to perform the next multiplexing scheduling processing.

Figure 3:
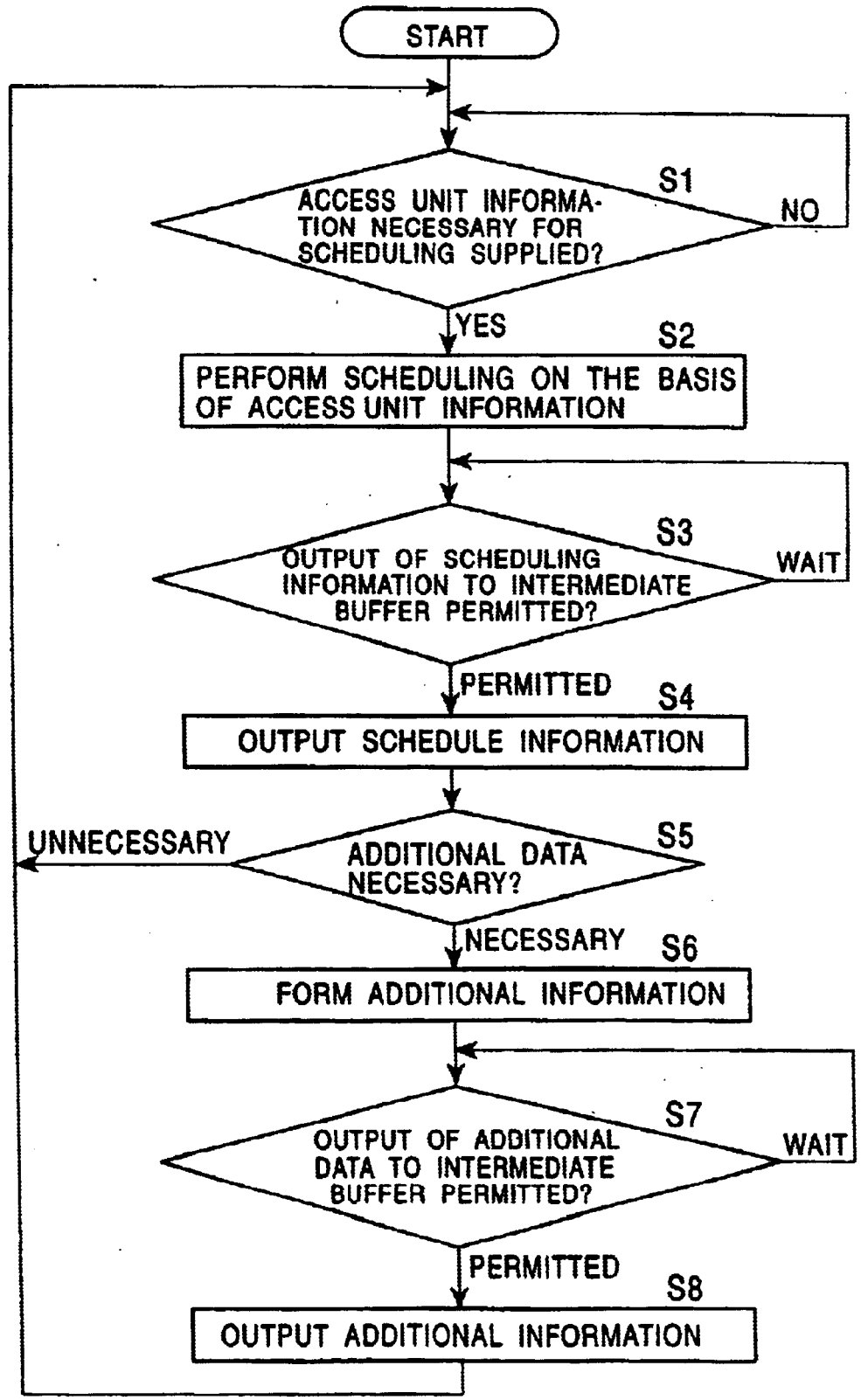
FIG. 3 is a flowchart for explaining the processing performed by scheduler 1 shown in FIG. 1.

In the process shown in FIG. 3, additional data is output after schedule information has been output. However, schedule information and additional information may be output in the reverse order or may be output simultaneously with each other.

Figure 4:
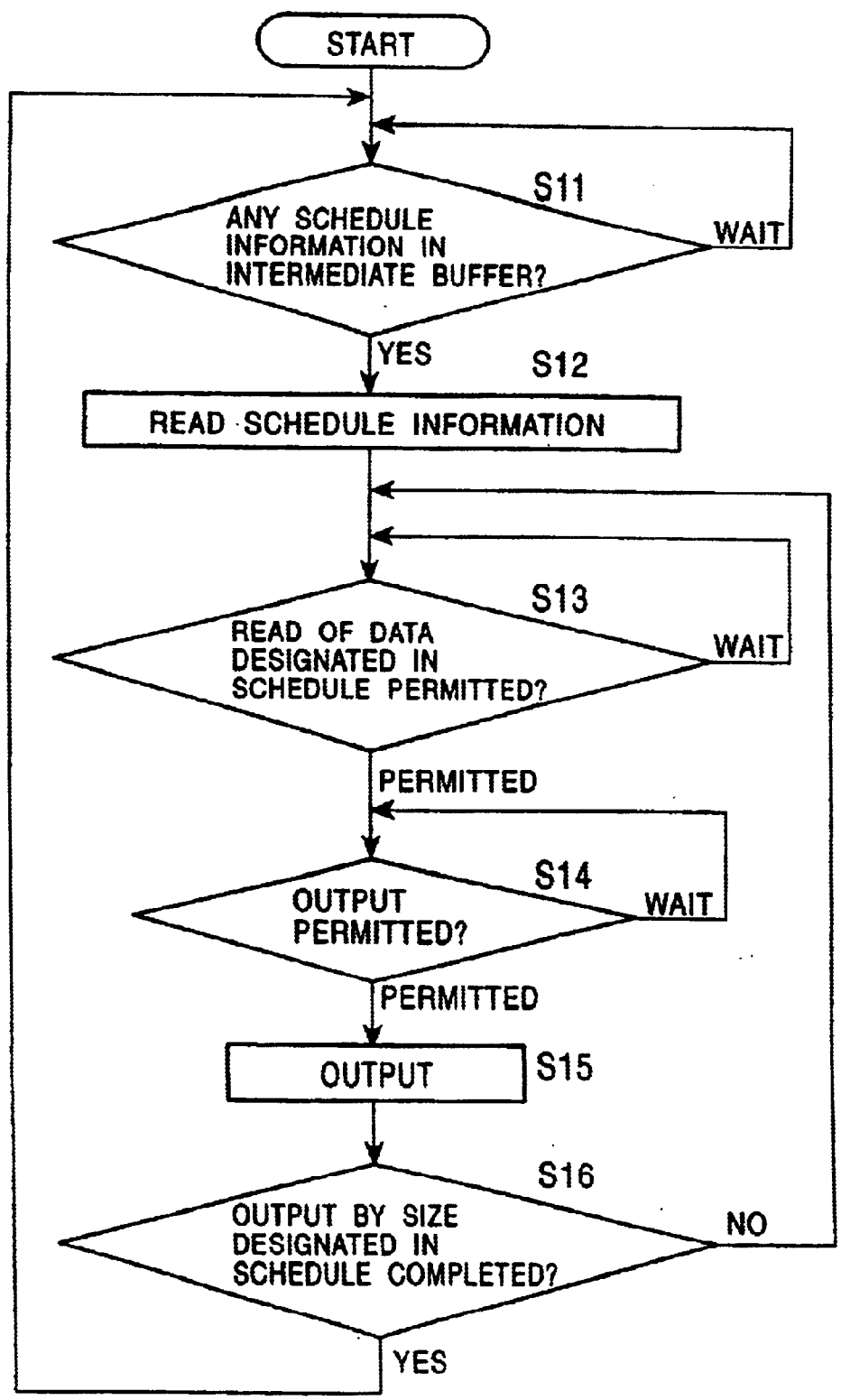
FIG. 4 is a flowchart for explaining the processing performed by bit stream multiplexer 4 shown in FIG. 1.

The operation of the bit stream multiplexer 4 shown in FIG. 1 will be described in more detail with reference to the flowchart of FIG. 4.

In step S11, in the bit stream multiplexer 4, a determination is first made as to whether some unused (unread) schedule information is stored in the schedule intermediate buffer 2.

If it is determined in step S11 that no unused schedule information is stored in the schedule intermediate buffer 2, that is, the schedule intermediate buffer 2 is empty, step S11 is repeated. If it is determined in step S11 that some unused schedule information is stored in the schedule intermediate buffer 2, the process advances to step S12 to read out the oldest of the unused schedule information stored in the schedule intermediate buffer 2.

If the schedule intermediate buffer 2 is empty, it is necessary for the bit stream multiplexer 4 to stop bit stream multiplexing processing until the empty state is canceled. However, the suspension of bit stream multiplexing processing does not influence multiplexing scheduling processing performed by the scheduler 1 since the schedule intermediate buffer 2 is able to store new schedule information. In this situation, since decision by the bit stream multiplexer 4 as to whether multiplexing scheduling processing should be stopped depends upon whether the schedule intermediate buffer 2 is empty or not, it is not necessary for the bit stream multiplexer 4 to wait for reception of a multiplexing command from the scheduler 1 as in the conventional art.

After reading-out of schedule information from the schedule information intermediate buffer 2, the process advances to step S13 to make a determination as to whether the data designated by the schedule information can be selected (read out). Step S13 is repeated if it is determined in step 13 that the data designated by the schedule information read out in step 12 cannot be selected, that is, if the data designated by the schedule information is an elementary stream and if the elementary stream has not been input to the bit stream multiplexer 4, or if the data designated by the schedule information is additional data and if the additional data has not been input to the additional data intermediate buffer 3.

If it is determined in step 13 that the data designated by the schedule information read out in step 12 can be selected, the process advances to step S14 to select the data and to make a determination as to whether the selected data can be output as a multiplexed stream.

Step S14 is repeated if it is determined in step S14 that the data cannot be output as a multiplexed stream, that is, if, for example, in the case of transmitting the multiplexed stream through transmission medium 6, it is necessary to delay the multiplexed stream outputting time for matching to the transmission rate, or if, in the case of recording the multiplexed stream on recording medium 7, a recording apparatus (not shown) for performing this recording is in a waiting state.

If it is determined in step S14 that the data can be output as a multiplexed stream, the process advances to step S15 to output the data as a multiplexed stream. That is, if the data designated by the schedule information read out in step S12 is an elementary stream, the elementary stream is output as a multiplexed stream. If the data designated by the schedule information is additional data, the additional data is read out from the additional data intermediate buffer 3 (or fixed data memory 5) to be output as a multiplexed stream.

The process then advances to step S16 to make a determination as to whether the data has been output by the size designated by the schedule information read out in step S12. If it is determined in step S16 that the data has not been output by the size designated by the schedule information, the process returns to step S13. If it is determined in step S16 that the data has been output by the size designated by the schedule information, the process returns to step S11 to perform the next bit stream multiplexing processing.

Figure 5:
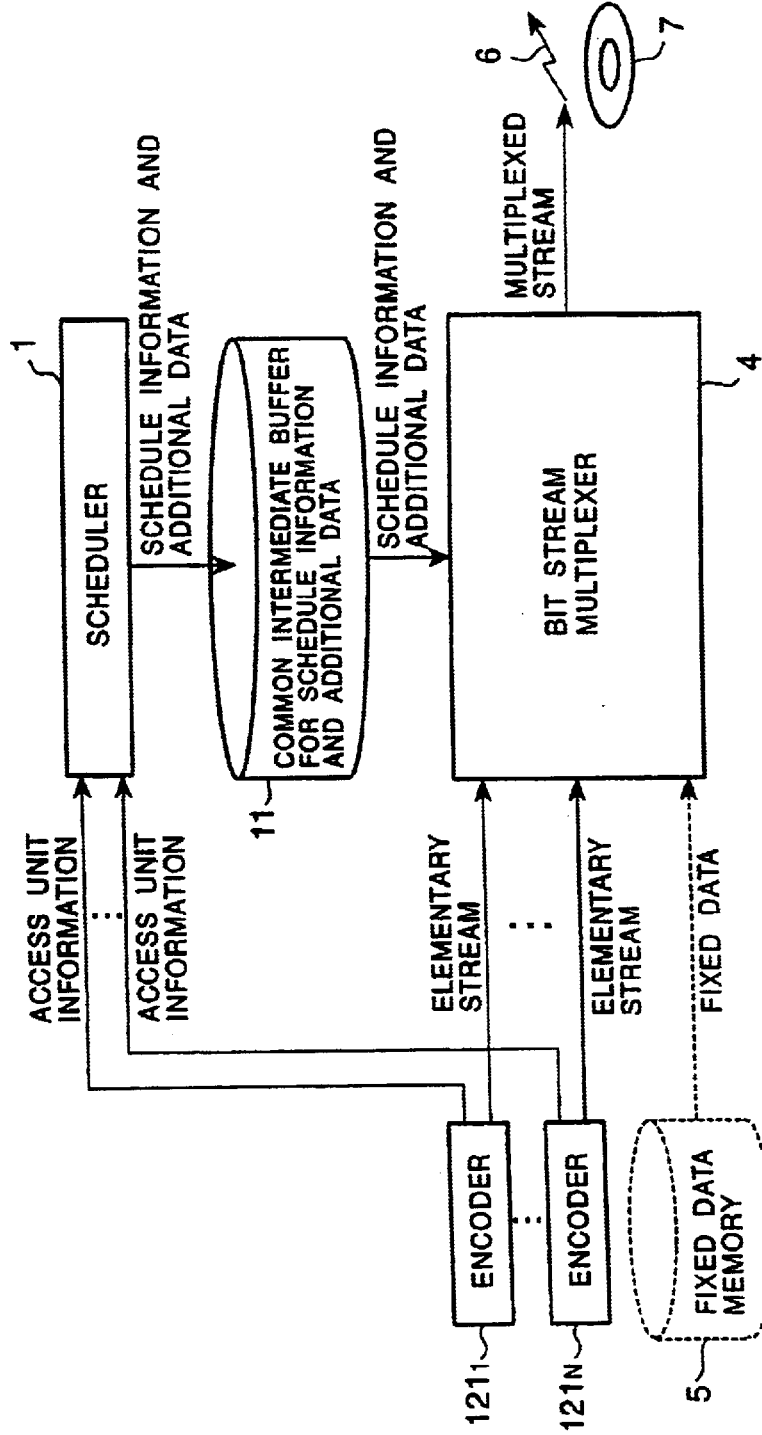
FIG. 5 is a block diagram showing the configuration of a second embodiment of the multiplexing apparatus to which the present invention has been applied.

FIG. 5 shows the configuration of another embodiment of the multiplexing apparatus to which the present invention has been applied. In FIG. 5, sections corresponding to those shown in FIG. 1 are indicated by the same reference characters. The same description for the corresponding sections will not be repeated. That is, this multiplexing apparatus is arranged in the same manner as the multiplexing apparatus shown in FIG. 1 except that a common intermediate buffer 11 (storage means) is provided in place of the schedule information intermediate buffer 2 and the additional data intermediate buffer 3.

The common intermediate buffer 11 is arranged in the same manner as the schedule information intermediate buffer 2 and the additional data intermediate buffer 3 shown in FIG. 1 to store each of schedule information and additional data output by the scheduler 1. That is, in the embodiment shown in FIG. 5, schedule information and additional data is stored in one common intermediate buffer 11 instead of being stored separately from each other.

In the embodiment shown in FIG. 5, if there is necessary additional data, the scheduler 1 outputs the additional data after outputting schedule information. Accordingly, in the common intermediate buffer 11, schedule information and necessary additional data are stored in the same order as that in which they are output by the scheduler 1.

On the other hand, the bit stream multiplexer 4 reads out schedule information and necessary additional data from the common intermediate buffer 11 in the same manner as in the case of reading out schedule information or necessary additional data from the schedule information intermediate buffer 2 or the additional data intermediate buffer 3, and performs bit stream multiplexing processing.

Schedule information and necessary additional data output by the scheduler 1 are used in the bit stream multipler 4 in the same order as that in which they are output by the scheduler 1. Therefore, there is no problem even if the schedule information and necessary additional data are stored in one common intermediate buffer 11 instead of being stored separately from each other. As a result, in this embodiment, the configuration of the multiplexing apparatus can be simplified.

As described above, schedule information and additional data output by the scheduler 1 are stored in such a manner as to prevent a delay of one of multiplexing scheduling processing in the scheduler 1 and bit stream multiplexing processing in the bit stream multiplexer 4 from influencing the other of these processings.

As a result, the need for using an apparatus having a reduced multiplexing rate or an apparatus capable of performing processing at a high speed is eliminated. Also, there is no need for providing a large-capacity buffer for storing a multiplexed stream. Moreover, it is not necessary to transmit and receive a multiplexing command and a multiplexing end notice as in the conventional art.

The above-described multiplexing apparatus can be applied to, for example, a personal computer which performs so-called desk top editing such that images and sounds recorded by a video camera are edited and are recorded after being compressed and encoded.

Figure 6:
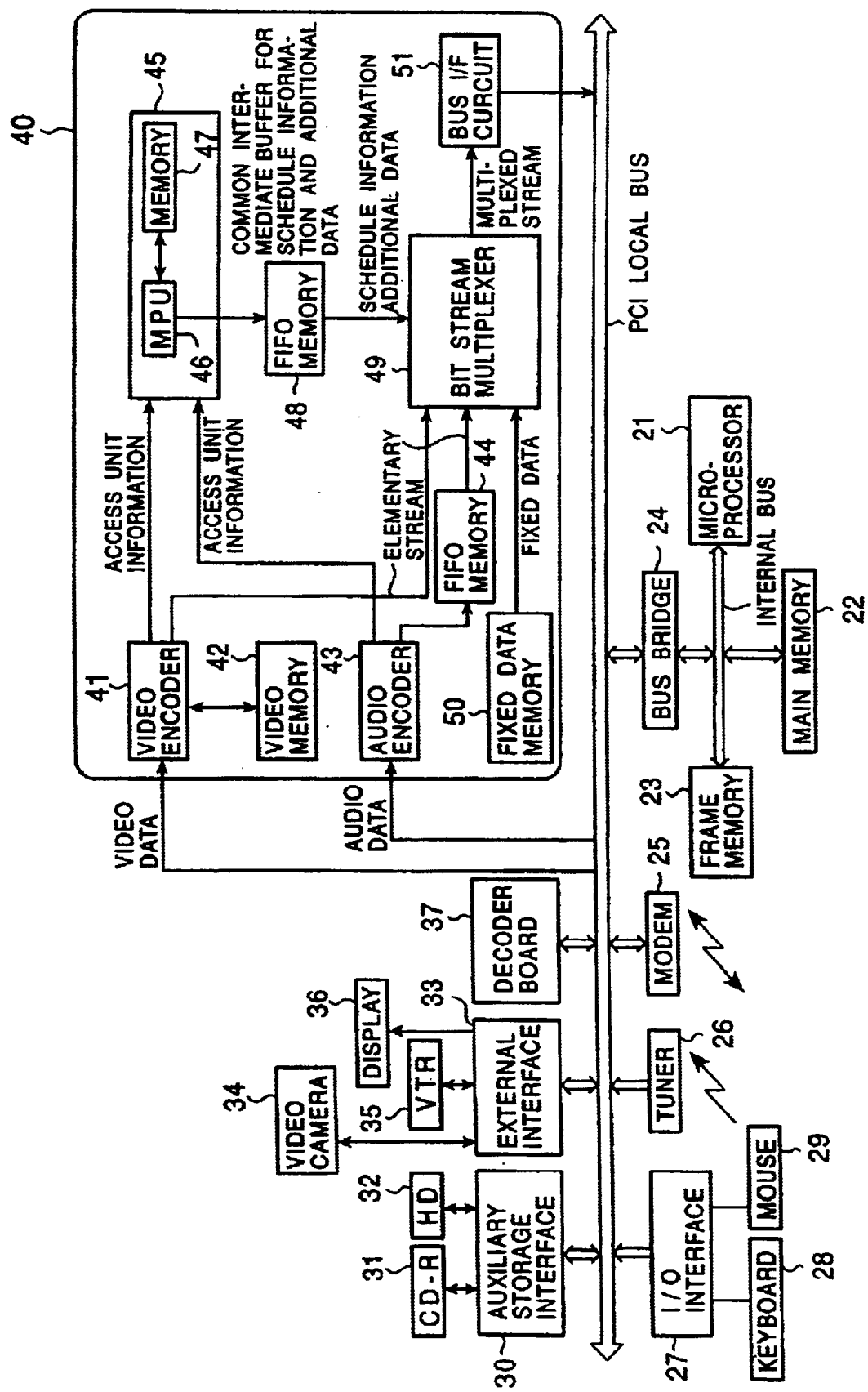
FIG. 6 is a block diagram showing the configuration of an embodiment of a personal computer to which the present invention has been applied.
Figure 7:
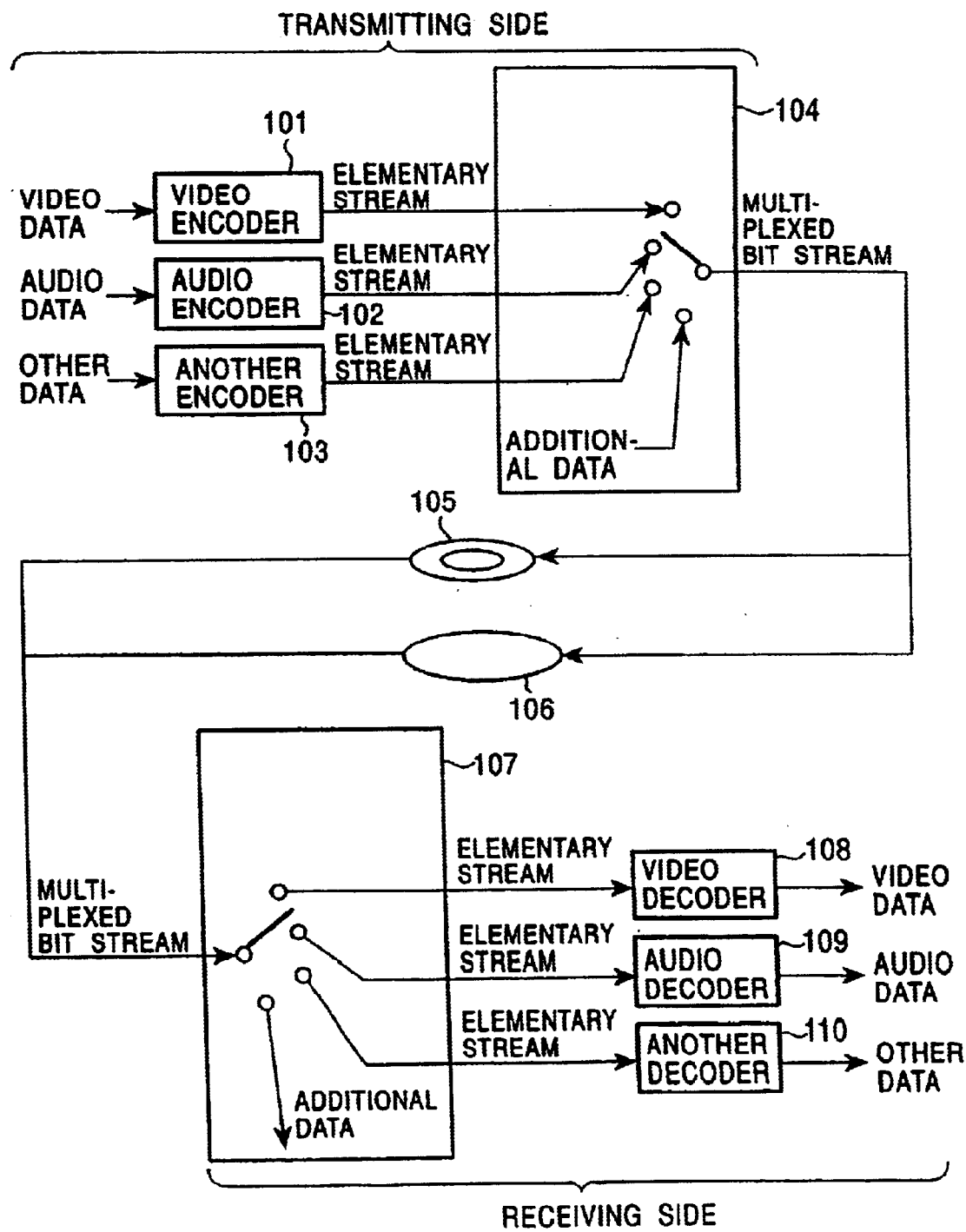
FIG. 7 is a block diagram showing the configuration of an example of a conventional multiplexing/demultiplexing apparatus.
Figure 8:
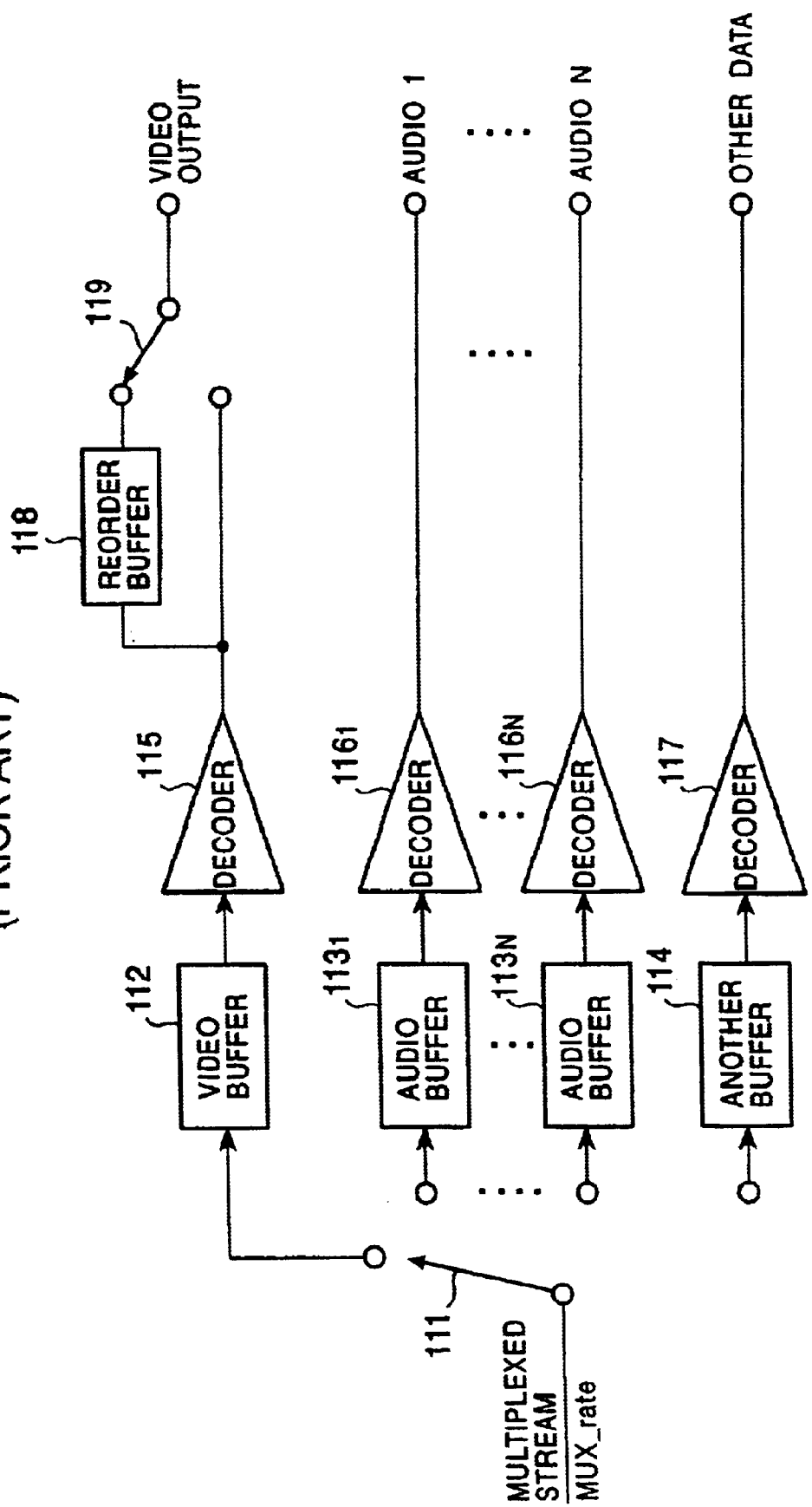
FIG. 8 is a block diagram showing the configuration of STD.
Figure 9A:
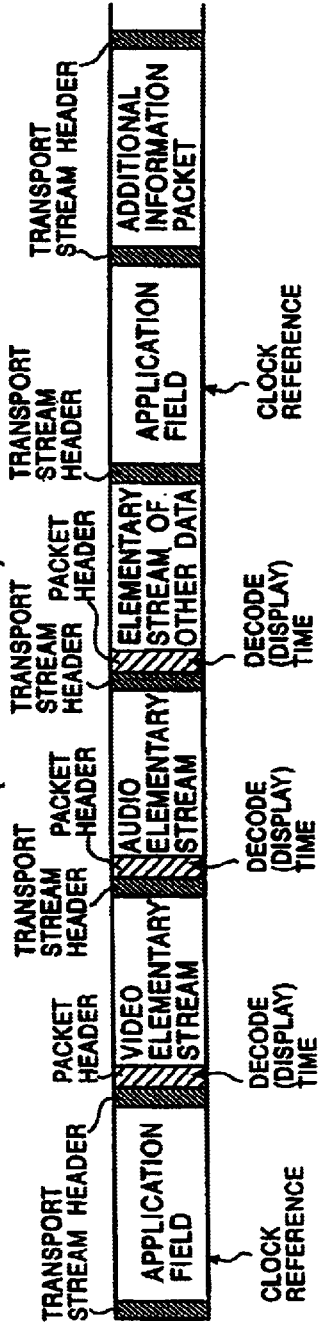
FIGS. 9A and 9B are diagrams of the formats of multiplexed streams, FIG. 9A showing the structure of a transport stream.
Figure 9B:
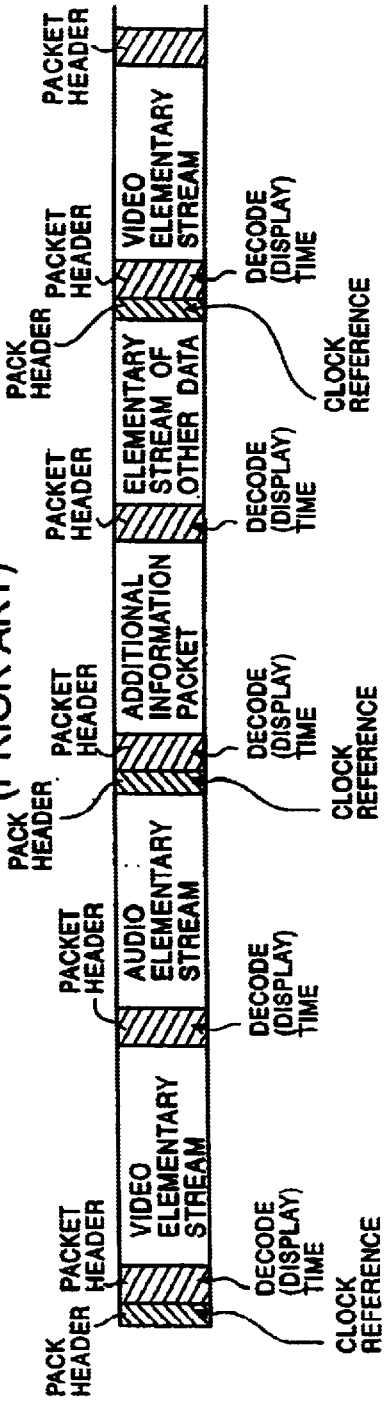
Figure 10:
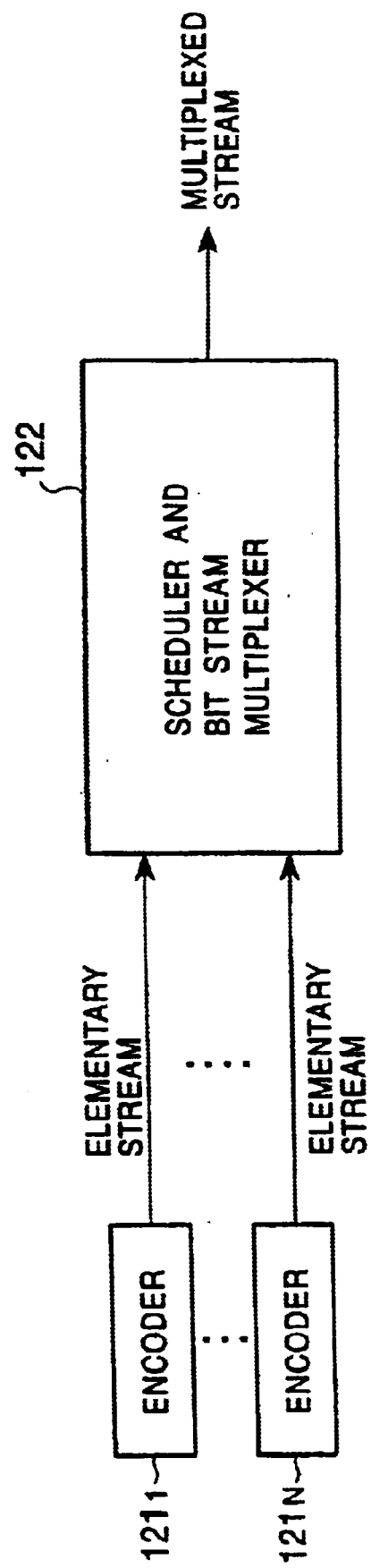
FIG. 10 is a block diagram showing the configuration of an example of a conventional multiplexing apparatus.

FIG. 6 shows the configuration of an embodiment of such a personal computer.

A microprocessor 21 performs predetermined processings such as image and sound editing of an input to it. A main memory 22 stores a program executed by the microprocessor 21 and data necessary for the operation of the microprocessor 21. A frame memory 23 is formed of a dynamic random access memory (DRAM) or the like and stores image data at the time of editing of a one-frame image or the like. A bus bridge 24 controls data exchange between an internal bus and a peripheral component interconnect (PCI) local bus.

The above-described microprocessor 21, main memory 22, frame memory 23 and bus bridge 24 are connected to each other via the internal bus. Other blocks are connected to each other via the PCI local bus. The bus bridge 24 is connected to each of the internal bus and the PCI local bus.

A modem 25 controls communication over a telephone circuit. For example, the modem 25 can treat, as objects of editing, images and sounds received from the Internet or the like, and can transmit edited images and sounds to an external terminal.

A tuner 26 receives, for example, a television broadcasting signal broadcasted by using, for example, a ground wave, a satellite channel or a CATV network. Images and sounds received by the tuner 26 can also be treated as objects of editing.

An I/O (input/output) interface 27 outputs operation signals corresponding to the operation of a keyboard 28 or a mouse 29. The keyboard 28 is operated at the time of inputting predetermined data or command. The mouse 29 is operated at the time of moving a cursor displayed on a display 36, designating a position, or the like.

An auxiliary storage interface 30 controls read and write of data on a compact disk recordable (CD-R) 31, a hard disk (HD) 32 or the like. On the CD-R or HD 32, images and sounds provided as objects of editing, edited images and sounds, etc., are recorded.

An external interface 33 is arranged to control inputting of images and sounds to a video camera 34, a video tape recorder (VTR) 35, a display 36, etc. and outputting of images and sounds from these devices. The video camera 34 forms images used as an object of editing, etc. The VTR 35 reproduces editing object images and sounds already recorded, and records edited images and sounds, etc. The display 36 displays editing object images, edited images, etc.

On a decoder board 37, a multiplexed stream obtained from an encoder/multiplexing board 40 is demultiplexed and elementary streams thereby obtained are decoded.

The encoder/multiplexing board 40 encodes images and sounds from the modem 25, tuner 26, CD-R 31, HD 32, video camera 34, or VTR 35 to obtain elementary streams, and multiplexes the elementary streams to form a multiplexed stream.

That is, data of images (video data) is input to a video encoder 41, which encodes the input video data and outputs the encoded data as an elementary stream. This video data elementary stream is supplied to and stored in a video memory 42. The elementary stream stored in the video memory 42 is read out according to a need by a bit stream multiplexer 49 via the video encoder 41.

The video encoder 41 also outputs, to a scheduler 45, access unit information on the elementary stream that it has output.

Data of sounds (audio data) is input to an audio decoder 43, which encodes the input audio data and supplies the encoded data as an elementary stream to a first in first out (FIFO) memory 44, thereby storing the encoded data. The elementary stream stored in the FIFO memory 44 is read out by the bit stream multiplexer 49 according to a need.

The audio encoder 43 also outputs, to the scheduler 45, access unit information on the elementary stream that it has output.

The scheduler 45 corresponds to the scheduler 1 shown in FIGS. 1 and 5, and is formed of an MPU (microprocessor) 46 and a memory 47 in this embodiment. The MPU 46 calculates schedule information and necessary additional data on the basis of access unit information supplied to it, and outputs the calculated information and data to a FIFO memory 48.

The FIFO memory 48 corresponds to the common intermediate buffer 11 shown in FIG. 5. The FIFO memory 48 stores schedule information and additional data from the scheduler 45 (MPU 46).

[0125]

The bit stream multiplexer 49, corresponding to the bit stream multiplexer 4 shown in FIGS. 1 and 5, reads out schedule information from the FIFO memory 48 and selects, in accordance with the schedule information, data to be output as a multiplexed stream.

That is, when an elementary stream of video data or audio data is to be selected, the elementary stream is read out from the video memory 42 or the FIFO memory 44 to be output as a multiplexed stream. When additional data output by the scheduler 45 is to be selected, the additional data is read out from the FIFO memory 48 to be output as a multiplexed stream. Further, when fixed data in additional data is to be selected, the fixed data is read out from a fixed data memory 50. That is, the fixed data memory 50 corresponds to the fixed data memory 5 shown in FIGS. 1 and 5, and has fixed data stored therein. When fixed data is to be selected, the fixed data is read out from the fixed data memory 50 to be output as a multiplexed stream.

A multiplexed stream output from the bit stream multiplexer 49 is supplied to a bus interface (I/F) circuit 51. The bus I/F circuit 51 outputs the received multiplexed stream to the PCI local bus.

The multiplexed stream output to the PCI local bus is supplied to, for example, the decoder board 37, on which the multiplexed stream is demultiplexed and decoded and is thereafter supplied to the VTR 35 via the external interface 33 to be recorded, or is supplied to the display 36 to be displayed. Also, the multiplexed stream output to the PCI local bus is supplied to, for example, the CD-R 31 or the HD 32 via the auxiliary storage interface 30 to be recorded, or is supplied to the microprocessor 21 via the bus bridge 24 and the internal bus to undergo predetermined edit processing. The microprocessor 21 is arranged so as to be able to edit (by cut-editing, for example) a multiplexed stream in the multiplexed form as well as data obtained by demultiplexing and decoding a multiplexed stream.

Since schedule information and additional information output by the scheduler 45 are stored in the FIFO memory 48 as described above, a delay of one of the two processings in the scheduler 45 or the bit stream multiplexer 49 under a basic condition does not influence the other of the two processings, as in the case of the arrangements shown in FIGS. 1 and 5.

Therefore, the MPU 46 constituting the scheduler 45, for example, can be made to perform processings other than multiplexing scheduling processing, e.g., control of communication with the microprocessor 21, control of the video encoder 41 and the audio encoder 43, and the like.

Further, even if a transfer unit of the multiplexed stream transferred to the PCI local bus or the like does not coincide with the schedule unit corresponding to, for example, the packet unit, the multiplexed stream can be transferred as a unit most suitable for the PCI local bus or a multiplexed stream transfer destination without a buffer provided between the bit stream multiplexer 49 and the bus I/F circuit 51.

In this embodiment, images and sounds are MPEG-encoded. However, the encoding method is not limited to those in accordance with the MPEG standards. The present invention can also be applied to multiplexing of images and sounds without encoding the images and sounds.

While the embodiment has been described with respect to the case of multiplexing a plurality of elementary streams, the present invention can also be applied to multiplexing of one elementary stream with additional data.

The present invention can be realized by means of either hardware or software.

In the multiplexing apparatus and the multiplexing method of the present invention described above, schedule information on a schedule of time division multiplexing is calculated on the basis of access unit information on an access unit prescribed in a bit stream, additional information is also calculated, and the schedule information and the additional information are stored. The bit stream and the additional information are time-division-multiplexed on the basis of the schedule information. Therefore, it is basically possible to prevent a delay of one of the processing for calculating schedule information and the processing for time-division-multiplexing the bit streams and the additional information from influencing the other of these processings.

In the transmitting method, the transmitting method and the recording medium in another aspect of the present invention, a multiplexed stream is obtained by calculating schedule information on a schedule of time division multiplexing on the basis of access unit information on a access unit prescribed in a at least one bit stream, by calculating additional information, by storing the schedule information and the additional information, and by time-division-multiplexing the bit stream and the additional information on the basis of the schedule information. In obtaining the multiplexed stream, therefore, it is basically possible to prevent a delay of one of the processing for calculating schedule information and the processing for time-division-multiplexing the bit streams and additional information from influencing the other of these processings.

What is claimed is:

1. A multiplexing apparatus which time-division-multiplexes at least one elementary bit stream and additional information into a multiplexed bit stream, said apparatus comprising:

schedule information calculation means for calculating schedule information on a schedule of time division multiplexing on the basis of access unit information on an access unit prescribed in the multiplexed bit stream;

schedule information storage means for storing the schedule information output by said schedule information calculation means;

additional information calculation means for calculating the additional information;

additional information storage means for storing the additional information output by said additional information calculation means; and multiplexing means for time-division-multiplexing the elementary bit stream and the additional information read out from the additional information storage means in accordance with the schedule information read out from said schedule information storage means.

2. A multiplexing apparatus according to claim 1, wherein said schedule information storage means and said additional information storage means are formed by one storage means.

3. A multiplexing apparatus of claim 1, wherein said schedule information calculation means avoids an underflow and an overflow in a receiving terminal for the bit stream.

4. A multiplexing apparatus of claim 1, wherein said schedule information calculation means is interrupted when said schedule information storage means is full.

5. The multiplexing apparatus of claim 1, further comprising recording means for recording the multiplexed bit stream output on at least one recording medium.

6. A multiplexing method of time-division-multiplexing at least one elementary bit stream and additional information into a multiplexed bit stream, said method comprising the steps of:

calculating schedule information on a schedule of time division multiplexing on the basis of access unit information on an access unit prescribed in the multiplexed bit stream, and calculating the additional information;

storing the schedule information and the additional information; and time-division-multiplexing the elementary bit stream and the additional information read out from the additional information storage means in accordance with the schedule information.

7. A multiplexing method of claim 6, wherein the step of calculating schedule information avoids an underflow and an overflow in a receiving terminal for the bit stream.

8. A multiplexing method of claim 6, wherein said schedule information is stored in a storage means, and wherein the step of calculating schedule information is interrupted when said storage means is full.

9. A transmitting apparatus which transmits a multiplexed bit stream formed by time-division-multiplexing at least one elementary bit stream and additional information into the multiplexed bit stream, said apparatus comprising:

means for inputting the multiplexed bit stream and forming the multiplexed bit stream; and means for transmitting the multiplexed bit stream, the multiplexed stream being obtained by:

calculating schedule information on a schedule of time division multiplexing on the basis of access unit information on an access unit prescribed in the multiplexed bit stream, and calculating the additional information;

storing the schedule information and the additional information; and time-division-multiplexing the elementary bit stream and the additional information read out from the additional information storage means in accordance with the schedule information.

10. A transmitting method of transmitting a multiplexed bit stream formed by time-division-multiplexing at least one elementary bit stream and additional information into the multiplexed bit stream, said method comprising the steps of:

inputting the multiplexed bit stream and forming the multiplexed bit stream; and transmitting the multiplexed bit stream, the multiplexed bit stream being obtained by:

calculating schedule information on a schedule of time division multiplexing on the basis of access unit information on an access unit prescribed in the multiplexed bit stream, and calculating the additional information;

storing the schedule information and the additional information; and time-division-multiplexing the elementary bit stream and time-additional-information read out from the additional information storage means in accordance with the schedule information.

11. A recording medium on which a multiplexed bit stream, formed by time-division-multiplexing at least one elementary bit stream and additional information into the multiplexed bit stream, is recorded, the multiplexed bit stream being obtained by:

calculating schedule information on a schedule of time division multiplexing on the basis of access unit information on an access unit prescribed in the multiplexed bit stream, and calculating the additional information;

storing the schedule information and the additional information; and time-division-multiplexing the elementary bit stream and the additional information read out from the additional information storage means in accordance with the schedule information.

12. A multiplexing apparatus which time-division-multiplexes at least one elementary bit stream and additional information into a multiplexed bit stream, said apparatus comprising:

a first calculator for calculating schedule information on a schedule of time division multiplexing on the basis of access unit information on an access unit prescribed in the multiplexed bit stream;

a first memory for storing the schedule information output by said calculator;

a second calculator for calculating the additional information;

a second memory for storing the additional information output by said second calculator; and a multiplexer for time-division-multiplexing the elementary bit stream and the additional information read out from the additional information storage means in accordance with the schedule information read out from said first memory.

13. A multiplexing apparatus according to claim 12, wherein said first memory and said second memory are formed as a one memory.

14. A transmitting apparatus which transmits a multiplexed bit stream formed by time-division-multiplexing at least one elementary bit stream and additional information into the multiplexed bit stream, said apparatus comprising:

an input device for inputting the multiplexed bit stream and forming the multiplexed bit stream; and a transmitter for transmitting the multiplexed bit stream, the multiplexed bit stream being obtained by:

calculating schedule information on a schedule of time division multiplexing on the basis of access unit information on an access unit prescribed in the multiplexed bit stream, and calculating the additional information;

storing the schedule information and the additional information; and time-division-multiplexing the elementary bit stream and the additional information read out from the additional information storage means in accordance with the schedule information.

* * * * *